July 3, 1928.  
W. K. MYKINS  
PLUMBER'S LEAD PIPE BENDING SPRING  
Filed April 25, 1927
1,675,574
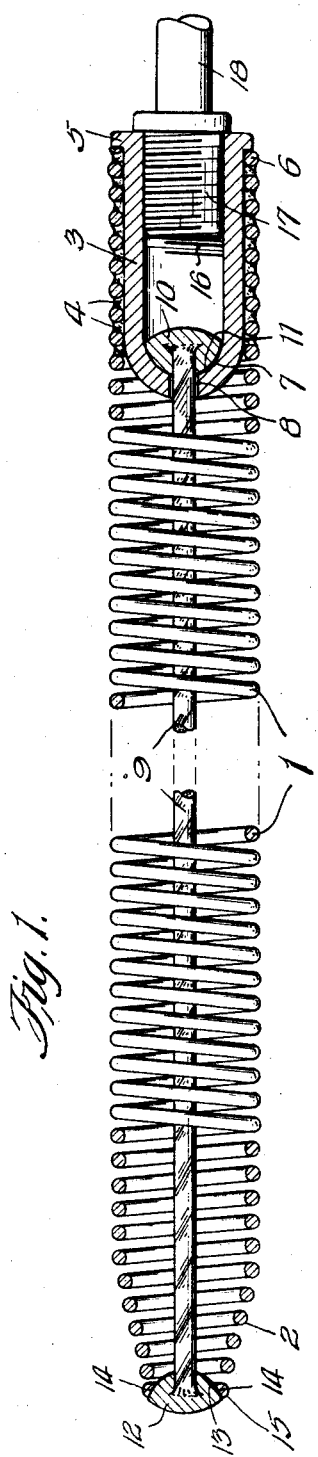
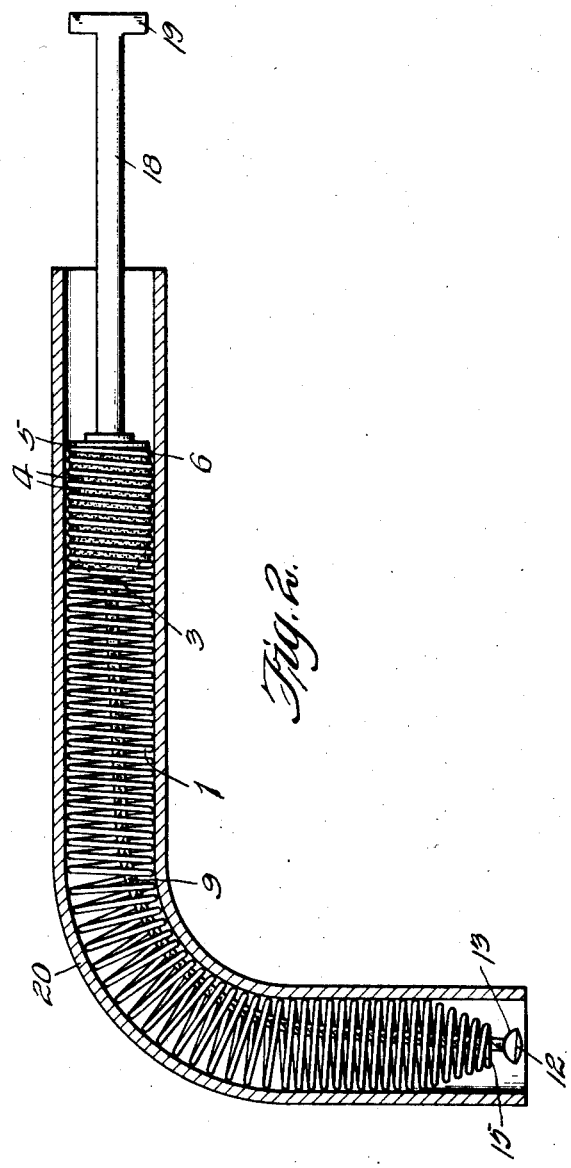
INVENTOR:  
W. K. Mykins.  
BY  
Fred J. Marron  
ATTORNEY.

Patented July 3, 1928.

1,675,574

UNITED STATES PATENT OFFICE.

WILLIAM K. MYKINS, OF ST. LOUIS, MISSOURI.

PLUMBER'S LEAD-PIPE-BENDING SPRING.

Application filed April 25, 1927. Serial No. 186,305.

My invention realtes to plumbers' lead pipe bending springs, and has for its object to provide a spring wherein its diameter can be readily reduced at any point where it may have a tendency to bind in a lead pipe during its removal from the pipe after the pipe has been bent at a distance from its end with the spring therein.

A further object of the invention is the provision of a flexible twisted wire cable core connection fixed at one end to a head member having a swivel connection with a socket member which is fixed to one end of the spring and provided at its opposite end with a head member having a swivel connection with the last coil of the spring.

A further object of the invention is the provision of a plumber's lead pipe bending spring which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings, forming a part of this specification, wherein like characters of reference denote similar parts throughout the several views:

Fig. 1 is a view partly in side elevation and partly in sectional elevation with a portion thereof broken away, of a plumber's lead pipe bending spring embodying the features of my invention.

Fig. 2, is a view in sectional elevation of a bent pipe showing the bending spring therein and with the coil pull and twisting member attached thereto.

In carrying out the aim of my invention, I employ a left hand wound spiral wire coil or spring 1, made of wire of suitable diameter with the coils or convolutions spaced apart a suitable distance that the same may be wound up, or closed endwise toward and if necessary upon each other so as to contract, or reduce the diameter of the spring by a right hand twisting action of the spring during its removal from within a bent lead pipe whenever binding of the spring with the wall of the bent pipe renders it necessary for the easy removal of the spring from the bent pipe. The follow up end of the spring has its coil suitably tapered as at 2.

The pull and twisting end of the spring 1 is provided with a cylindrical socket member 3 which is receivable in said end of the spiral spring 1 and is fixed to some of the wire coils of the spring by brazing, as at 4, or by any other well known fastening means, so as to fix the socket members to some of the coils of the spring 1. The socket member 3 is provided with a flanged outer end 5 which engages the end coil 6 of the spring 1, as shown in Fig. 1.

The socket member 3 is provided with an interior curved socket seat 7 at its inner end, and it is also provided with an opening 8 communicating with the interior of the socket member 3.

A flexible twisted multiple wire strand core or connecting cable 9 is disposed centrally and longitudinally within the spiral spring 1 passing through socket member opening 8 and is provided at one end with a fixed suitable head member 10 having a curved face 11 which is seated in the curved socket seat 7, as shown in Fig. 1. The opposite end of the cable 9 is provided with a fixed suitable head member 12 having the curved face 13 which is seated upon the tapered or beveled face 14 of the end coil 15 of the spring 1, in such a manner that the major portion of the head member 12 is disposed within the spiral spring 1, as shown in Fig. 1.

The socket member 3 is provided with the internal screw threads 16 to engage with the externally screw threaded shank 17 from which extends a suitable coil pull and twisting member 18, the outer end of which is provided with a cross head, or handle 19, as will be apparent from Fig. 2.

In operation:—

When it is desired to bend a lead pipe such for instance as shown, which is illustrative only, the spiral bending spring 1 is inserted into the lead pipe 20 to that portion of the pipe which is to be bent. The outer diameter of the bending spring 1 is in every instance of approximately the same diameter as the inside diameter of the lead pipe to be bent.

If, after the lead pipe has been bent with the bending spring 1 therein, which spring prevents collapsing of the pipe at the bend, it is not easily and readily removable from the pipe, the operator starts pulling and twisting the spring 1 to the right through the handle connection with the socket 3, thus causing the coils of the spring to wind up toward each other, which necessarily reduces the diameter of the coils below that which they naturally assume by their own elasticity, from the first coil adjacent the socket to the coil or coils which are sticking at the bend thereby releasing any binding effect of the coil with the wall of the pipe at the bend and permitting of its easy and quick removal from the bent portion of the pipe.

I have found in practice that the sprial bending spring 1 is easily removable from a pipe that has been bent into a complete knot without in any way damaging or misshaping the pipe due to the employment of the wire cable 9 with its end head members 10 and 12 being swivelly seated within the socket member 3 and upon the end coil 15 of the spring 1. This arrangement prevents the coils from being stretched apart beyond their natural parallel position with relation to each other, thereby saving the spring from injury by being stretched too far in the pulling of the spring when stuck in a pipe, as the heads 10 and 12 will prevent any undue stretching apart of the coils.

It will be observed from Fig. 2, that the cable 9 will assume a position similar that shown when the bend has been made, thus causing the cable to slack a little and which will cause the head 12 to disengage its seat 14 on the end coil 15 of the spring 1. When twisting and pulling at the same time upon the spring to start it to moving when stuck at a bend, the head 12 will engage its seat 14 and will act in a sense as a pusher for the tapered end of the spring.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence reserve the right to make any such changes as may fairly fall within the scope of the appended claims when fairly construed.

What I claim is:

1. In a plumber's lead pipe bending spring, a spirally wound wire coil having one end tapered, a socket member fixed to one end of said wire coil, a flexible cable within the wire coil, a head member fixed to one end of the cable and swivelly seated in said socket member, a tapered seat formed upon the last coil of the tapered end of the wire coil and a head member fixed to the opposite end of the cable for swivel seating engagement with the tapered seat of said last coil, said head member having its major portion within the wire coil.

2. In a plumber's lead pipe bending spring, a spirally wound wire coil having one end tapered, a socket member fixed to one end of said wire coil, a flexible cable within the wire coil, a head member fixed to one end of the cable and swivelly seated in said socket member, a tapered seat formed upon the last coil of the tapered end of the wire coil, a head member fixed to the opposite end of the cable for swivel seating engagement with the tapered seat of said last coil, said head member having its major portion within the wire coil and a coil pull and twisting member having screw threaded connection with said socket member.

3. In a plumber's lead pipe bending spring, a left hand spirally wound round wire coil having a tapered end, a tapered seat formed in the last coil of the tapered end, a socket member fixed to and within the opposite end of the wire coil, a flange for said socket member engaging the last coil at the socket end of the wire coil, an interior curved seat at the inner end of the socket member, a head member having a curved face swivelly engaging the tapered seat of the last coil of the tapered end of the wire coil, a flexible cable fixed at one end to said head member and extending longitudinally through the wire coil and having its opposite end pasing through an opening in the wall of the socket member and a head member having a curved face swivelly engaging the curved interior seat of the socket member.

4. In a plumber's lead pipe bending spring, a left hand spirally wound round wire coil having a tapered end, a tapered seat formed in the last coil of the tapered end, a socket member fixed to and within the opposite end of the wire coil, a flange for said socket member engaging the last coil at the socket end of the wire coil, an interior curved seat at the inner end of the socket member, a head member having a curved face swivelly engaging the tapered seat of the last coil of the tapered end of the wire coil, a flexible cable fixed at one end to said head member and extending longitudinally through the wire coil and having its opposite end passing through an opening in the wall of the socket member, a head member having a curved face swivelly engaging the curved interior seat of the socket member and a member removably connected with said socket member for imparting pulling and twisting force to said wire coil during its removal from a bent lead pipe.

In testimony whereof I have hereunto affixed my signature.

WILLIAM K. MYKINS.